United States Patent
Pan et al.

(10) Patent No.: US 8,213,311 B2
(45) Date of Patent: Jul. 3, 2012

(54) CONTROL PLANE TO DATA PLANE BINDING

(75) Inventors: Ping Pan, San Jose, CA (US); Richard Gitlin, Little Silver, NJ (US)

(73) Assignee: Brixham Solutions Ltd., Tortola (VG)

( * ) Notice: Subject to any disclaimer, the term of this patent is extended or adjusted under 35 U.S.C. 154(b) by 9 days.

(21) Appl. No.: 11/580,530

(22) Filed: Oct. 12, 2006

(65) Prior Publication Data

US 2008/0037425 A1 Feb. 14, 2008

Related U.S. Application Data

(60) Provisional application No. 60/726,115, filed on Oct. 12, 2005.

(51) Int. Cl.
*G08C 15/00* (2006.01)

(52) U.S. Cl. ... 370/232; 370/230; 370/254; 370/395.21; 370/395.2

(58) Field of Classification Search .................. 370/230, 370/254, 395.2, 395.21
See application file for complete search history.

(56) References Cited

U.S. PATENT DOCUMENTS

| | | | |
|---|---|---|---|
| 5,920,705 A | 7/1999 | Lyon et al. | |
| 6,430,184 B1 | 8/2002 | Robins et al. | |
| 6,621,793 B2 | 9/2003 | Widegren et al. | |
| 6,813,271 B1 | 11/2004 | Cable | |
| 6,845,389 B1* | 1/2005 | Sen et al. | 709/204 |
| 7,050,396 B1* | 5/2006 | Cohen et al. | 370/235 |
| 7,436,782 B2* | 10/2008 | Ngo et al. | 370/254 |
| 2003/0039237 A1 | 2/2003 | Forslow | |
| 2004/0105459 A1 | 6/2004 | Mannam | |
| 2004/0174865 A1 | 9/2004 | O'Neill | |
| 2004/0252717 A1 | 12/2004 | Solomon et al. | |
| 2005/0044262 A1 | 2/2005 | Luo | |
| 2005/0108328 A1* | 5/2005 | Berkeland et al. | 709/204 |
| 2006/0227767 A1* | 10/2006 | Johnson et al. | 370/356 |
| 2008/0144632 A1* | 6/2008 | Rabie et al. | 370/395.5 |

OTHER PUBLICATIONS

Braden et al. "Integrated Services in the Internet Architecture: an overview," Network Working Group, Jun. 1994.
Bryant et al. "Pseudo wire Emulation Edge-to-Edge (PWE3) Architecture," Network Working Group, Mar. 2005.
Blake et al. "An Architecture for Differentiated Services," Network Working Group, Dec. 1998.

* cited by examiner

*Primary Examiner* — Huy D Vu
*Assistant Examiner* — Omer Mian

(57) ABSTRACT

Binding a control plane to a data plane is disclosed. Binding includes receiving a request to initiate a session, wherein the request is sent via a Session Initiation Protocol (SIP)-based protocol and transmitting a set of one or more service parameters associated with the request to an edge node configured to participate in the session.

18 Claims, 12 Drawing Sheets

CONTROL PLANE TO DATA PLANE BINDING

CROSS REFERENCE TO OTHER APPLICATIONS

This application claims priority to U.S. Provisional Patent Application No. 60/726,115 entitled IMS-BASED NETWORK CONVERGENCE WITH THE HSX filed Oct. 12, 2005 which is incorporated herein by reference for all purposes.

BACKGROUND OF THE INVENTION

In recent years, network service providers have been upgrading and managing networks based on Multi Protocol Label Switching (MPLS) technology. MPLS has been deployed in most backbone networks. MPLS provides capabilities such as Quality of Service (QoS), redundancy, Operations Administration and Maintenance (OAM), and Virtual Private Network (VPN). MPLS is typically used to provision and manage data streams at individual flow levels. Each flow is known as a Label Switched Path (LSP). Existing MPLS systems typically handle data traffic at the Layer-3 (IP) level and below.

Some MPLS networks use Pseudowires to map Open System Interconnections (OSI) Layer-1 or Layer-2 traffic flows into "virtual circuits." A Pseudowire refers to the emulation of a Layer-1 or Layer-2 native service over a network. Examples of native services include Asynchronous Transfer Mode (ATM), Frame Relay, Ethernet Virtual Local Area Network (VLAN), Time Division Multiplexing (TDM), Synchronous Optical Network (SONET), Synchronous Digital Hierarchy (SDH), etc. In the control plane, the Pseudowires are maintained and managed using a simplified version of Label Distribution Protocol (LDP), the Target LDP. Each Pseudowire is associated with an MPLS label for packet forwarding and a control word for flow management.

Since existing MPLS networks only allow Layer-1 or Layer-2 connections to be mapped to Pseudowires in a one-to-one mapping, the system typically cannot guarantee the QoS for individual applications that generate application data in Layer-3 or above. QoS behavior in the application layer is sometimes different from the behavior in Layer-1 or Layer-2. For example, packet video streams can generally tolerate out-of-sequence delivery, and packet voice traffic can sometimes tolerate packet loss but is sensitive to packet delay. Existing Layer-1 and Layer-2 systems, however, typically do not address network-level QoS for these voice and video applications.

Some proposed IP-based models have been developed to address the QoS requirement associated with applications, but some issues remain. For example, the IntServ/RSVP model identifies connections by applications based on the IP addresses of the source and destination, the protocol type, and the protocol's source and destination port number (together known as the 5-tuple). Each connection is required to comply with a number of service parameters such as bandwidth consumption and delay budget. As a result, the intermediate nodes (such as the core routers) are required to store the identity of all the connections, perform deep packet inspection, and implement extensive QoS mechanisms to satisfy the service parameters for each flow. Network service providers tend to find this model limiting because it is not very scalable as the number of users grow.

New Internet protocols, such as Session Initiation Protocol (SIP), and Real Time Streaming Protocol (RTSP), have become increasingly popular for managing application layer signaling over the Internet. One of the motivations for those protocols is that they do not require knowledge of the underlying network, thereby providing a communication mechanism for any type of user in the network. Also, control plane paths do not necessarily traverse the same data plane traffic path. As a result, the data plane does not know the service parameters associated with the control plane, which prevents the ability to provide a predictable service guarantee.

Presently SIP has been widely deployed for Voice over IP (VoIP) applications, where user traffic does not require much network resource. Service providers can therefore guarantee reasonable service guarantees by over-provisioning their networks. However, as real-time video applications are becoming popular, user traffic volume may increase to a level that the over-provisioning approach may not be sufficient to overcome persistent network congestion in all parts of the network.

Existing systems have varying levels of data plane to control plane binding. For example, in cable networks, the access devices process both the user control messages and data packets. However, this approach does not scale in large networks.

Industry standard bodies such as International Telecommunication Union (ITU) have been working on a method to communicate and facilitate user service information to data gateways. The method is known as Resource and Admission Control Functions (RACF). However, this does not work beyond a single service provider network.

The Resource ReSerVation Protocol (RSVP) is a control protocol used to reserve resources in a network for data flows. It has been proposed that, upon receiving data traffic, when an RSVP message is received at an edge node, information is exchanged between the edge node and a bandwidth broker to reserve a data path for that traffic. However, the problem with RSVP is the exchange of information is specific for RSVP-based multimedia sessions, which has no deployment in the network today.

It would be useful to have a generic technique for binding the control plane with the data plane in a network that uses SIP-based or RTSP-based protocols to manage application layer signaling. It would also be desirable for such a technique to be independent of the underlying network control protocol.

BRIEF DESCRIPTION OF THE DRAWINGS

Various embodiments of the invention are disclosed in the following detailed description and the accompanying drawings.

DETAILED DESCRIPTION

Figure 1:
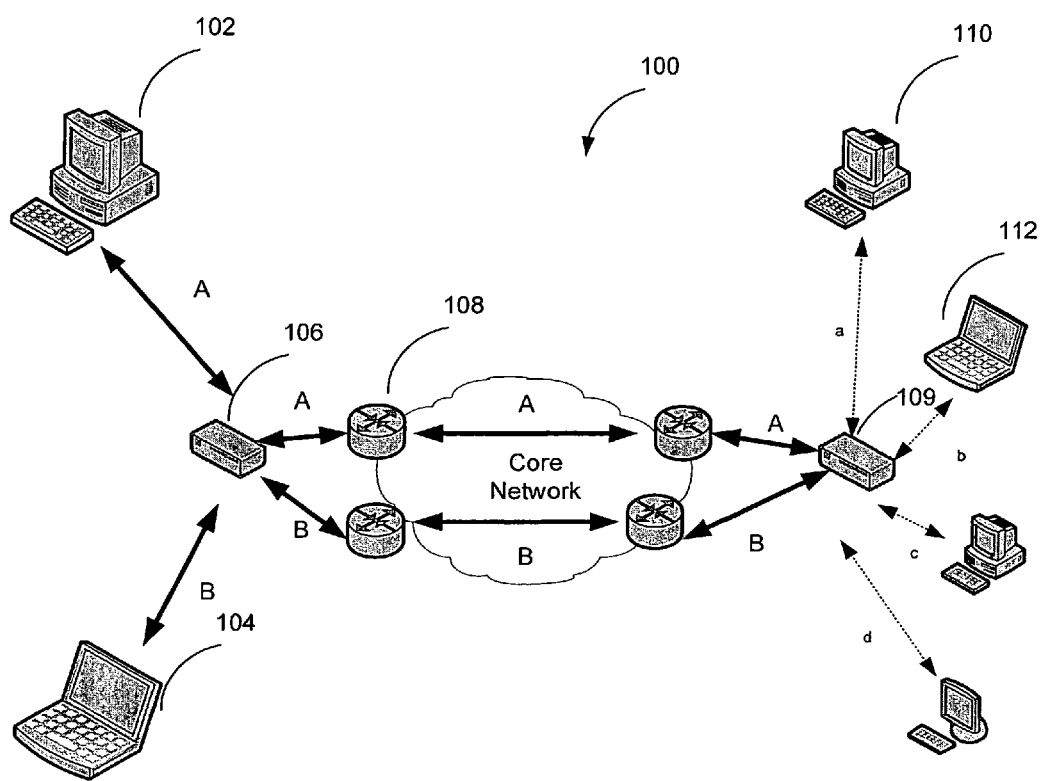
FIG. 1 is a system diagram illustrating an example of an MPLS based network supporting Pseudowires.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Binding a control plane to a data plane is disclosed. A control plane refers to communication associated with transfer of control information, for example, for initiating a session. A data plane refers to communication associated with transfer of data. In some embodiments, a request to initiate a session is received, wherein the request is sent via a SIP-based protocol. A set of one or more service parameters associated with the request are sent to an edge node configured to participate in the session. In some embodiments, the edge node uses at least one of the service parameters to establish an application wire over which data traffic is transferred.

An Application Wire refers to the emulation of a virtual circuit or a transparent wire for transferring one or multiple application flows. An Application Wire maps one or more application flows into Pseudowires, and is at the same time aware of the application protocol and the protocol requirements associated with the application flows. As used herein, an application flow refers to a set of packets exchanged between two or more devices for accomplishing a specific function. Application flow data includes data associated with Layer-4 or above as defined by the OSI protocol stack. In some embodiments, an application flow includes data packets transmitted and received by an application, such as a Voice over IP (VoIP) session, instant messaging, Video-on-Demand (VoD), etc. The application may be configured to operate on various wired, wireless, or hybrid devices. The interface between the application and the underlying network is provided by protocols such as the Session Initialization Protocol (SIP) and the Real-time Transport Protocol (RTP). From the perspective of the application, transferring data over an Application Wire has the same effect as transferring data over a dedicated wire. As will be shown in more detail below, in some embodiments, Application Wires are formed by mapping application flows to Pseudowires.

Application Wire

FIG. 1 is a system diagram illustrating an example of an MPLS based network supporting Pseudowires. In this example, client devices such as 102 and 104 reside on an edge network and transfer data to an edge device (also referred to as an edge node) 106. The edge node, for example an edge router, supports MPLS and is capable of mapping Layer-1 and Layer-2 data streams into Pseudowires. Each data stream is mapped to a single Pseudowire in a one-to-one mapping. Each packet in the Pseudowire is encapsulated with an MPLS label for forwarding, and includes a control word for flow management. The edge device forwards the packet to a core network that includes core routers such as 108. The core network is compatible with MPLS and IP. The end user traffic flows are mapped to Pseudowires and then fed to the core network. The Pseudowires are maintained throughout the core network. The Pseudowires terminate at edge node 109, which receives the Pseudowire traffic and forwards the packets to their appropriate destinations such as devices 110 and 112. Traffic from devices such as 110 and 112 to devices such as 102 and 104 is processed similarly.

Since the mapping of one data stream to one Pseudowire does not account for the bandwidth demand of individual applications generating traffic on the client devices, it is often difficult to guarantee the quality of service (QoS) for these individual applications. For example, assuming that Pseudowires A and B each support a data rate of 50 Mbps, and that the application executing on device 102 require 70 Mbps of bandwidth while the application on device 104 only requires 20 Mbps. Because of the one-to-one mapping, the bandwidth requirement of device 102 is not met by Pseudowire, even though there is excess capacity on the network overall.

Figure 2:
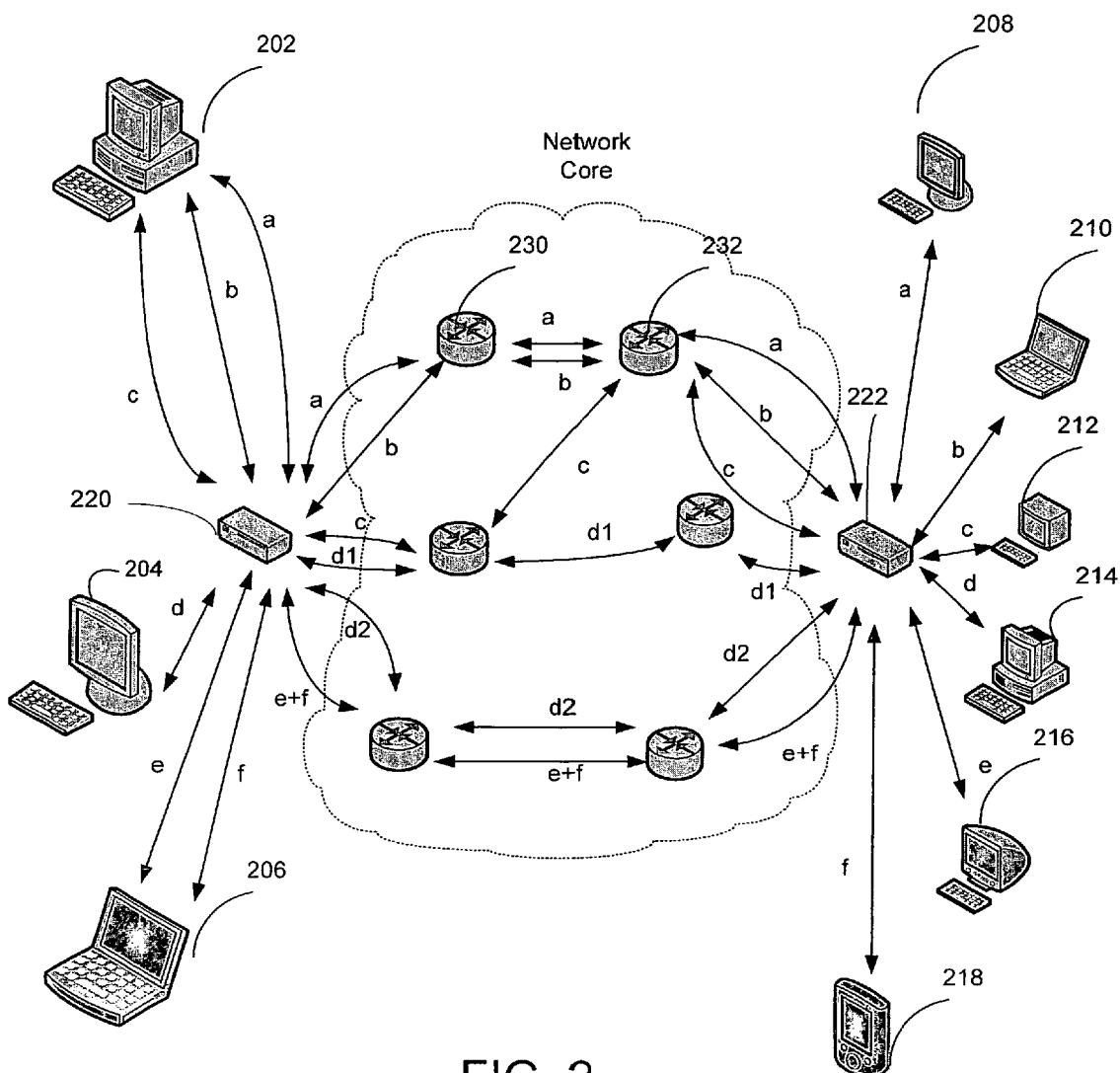
FIG. 2 is a system diagram illustrating an example of a network supporting Application Wires.

Application Wires improve on the Pseudowire scheme described above. FIG. 2 is a system diagram illustrating an example of a network supporting Application Wires. In this example, client devices 202-206 are configured to communicate with client devices 208-218 in the following manner: device 202 communicates with devices 208, 210, and 212; device 204 with device 214; device 206 with devices 216 and 218. Specifically, one or more applications executing on each client device send data to and receive data from applications executing on other client devices. Application flows a-f are shown between devices 202-206 and 208-218.

At the edge of the core network, edge nodes 220 and 222 are configured to transfer the data streams between a core network (such as a backbone network of a service provider) and the client devices. As used herein, data traffic is said to be in the ingress direction if it is being transferred from client devices to the core network, and in the egress direction if it is being transferred from the core network to clients devices. A data connection that transfers data in the ingress direction is referred to as a network-bound connection. Depending on the direction of the data flow, an edge node may be referred to as an ingress node or an egress node.

As will be shown in more detail below, the edge nodes map the application flows into Pseudowires in the ingress direction. A number of mapping schemes are possible, such as a one-to-one mapping, a distributed mapping where an application flow is mapped to multiple Pseudowires, or an aggregated mapping where multiple flows are mapped to a single Pseudowire. In the example shown, application flows a and b are one-to-one mapped to a separate Pseudowire each, application flow d is distributed to Pseudowires d1 and d2, and application flows e and f are aggregated to a single Pseudowire (e+f). The mapping scheme for each application flow is selected based at least in part on the bandwidth and traffic requirement associated with the application. In the egress direction, packets transferred on the Pseudowires are reassembled to the corresponding application flows and sent to the appropriate destinations. Each Pseudowire may span a plurality of intermediate nodes such as core routers 230 and 232. Unlike data transfer schemes where deep packet inspection is required at each intermediate node, the intermediate nodes used in this example can be standard MPLS devices and no change is required to make them support the Application Wire scheme.

Figure 3:
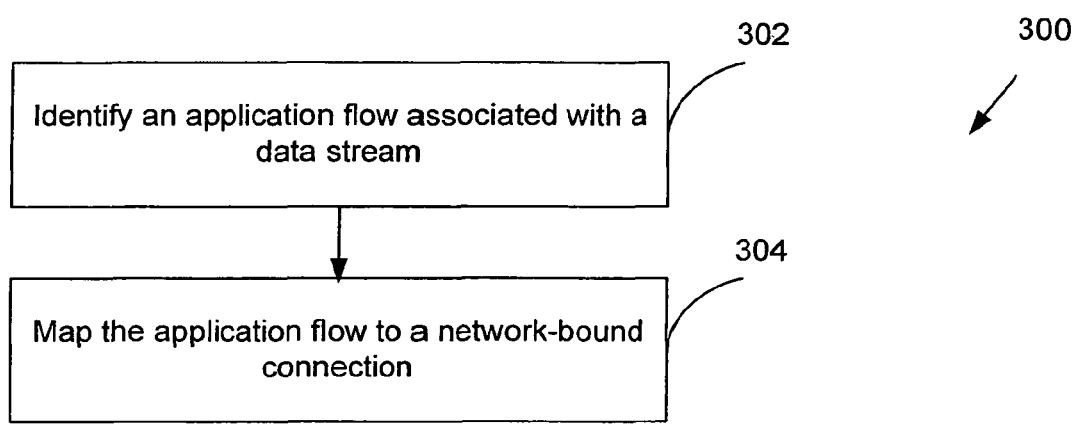
FIG. 3 is a flowchart illustrating an embodiment of a process for transferring data.

FIG. 3 is a flowchart illustrating an embodiment of a process for transferring data. Process 300 may be implemented on an edge node and can be used to process data streams in the ingress direction. In this example, the process initiates by identifying an application flow associated with a data stream being transferred over the network (302). Depending on the data stream, there may be one or more application flows within the same data stream. The identification may be achieved, for example, by inspecting the headers of the packets in the data stream. Further details of the identification process are discussed below. Once identified, the application flow is mapped to one or more network-bound connections such as Pseudowires (304) in accordance with the requirements of the application, forming one or more Application Wires.

Figure 4:
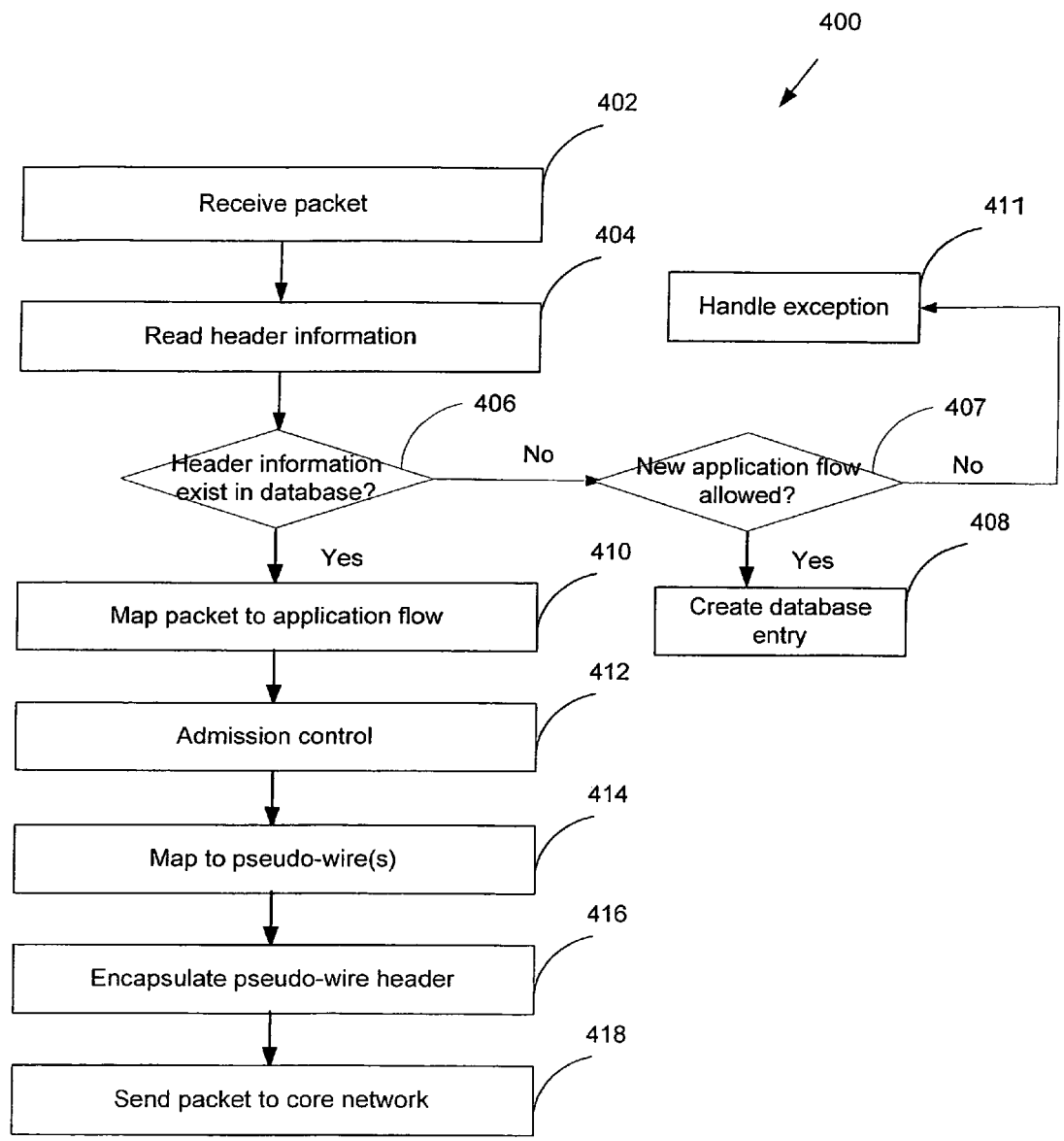
FIG. 4 is a flowchart illustrating another embodiment of a process for handling ingress data streams.

FIG. 4 is a flowchart illustrating another embodiment of a process for handling ingress data streams. Process 400 may be implemented on an edge node. In this example, process 400 initiates when a data packet is received (402). The header information of the received packet is read (404). The header information is used to identify the application flow. For purposes of example, it is assumed that the data stream carries IP data and that the data packet is an IP packet. Other types of data can be processed similarly based on the corresponding header formats. In this example, the IP packet includes a Layer-2 MAC header having fields such as the Ethernet addresses of the source and the destination. The IP packet further includes higher layer headers such as Layer-4 application protocol headers. The combination of various headers is used to identify specific application flows.

Figure 5:
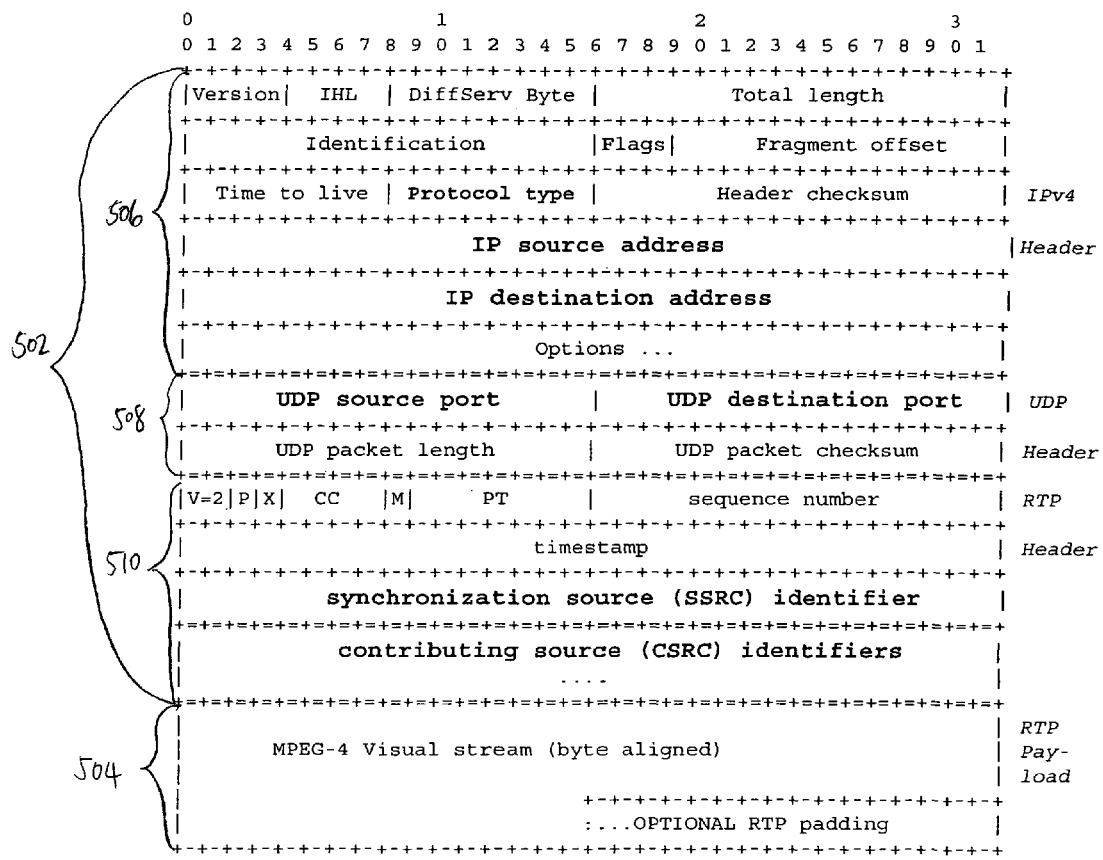
FIG. 5 is a diagram illustrating the format of a Real Time Protocol (RTP) packet example.

It is useful to inspect an example of a packet to understand how the application flow identification is done. FIG. 5 is a diagram illustrating the format of a Real Time Protocol (RTP) packet example. Packet 500 shown in the example is an MPEG-4 packet. It includes a header portion 502 and a payload portion 504. The header portion includes a Layer-3 (IPv4) header 506, and Layer-4 headers which in this case include UDP header 508 and RTP header 510. Several fields from each of the headers are extracted to provide information useful for identifying the application flow, including the IP source address and IP destination address, protocol type (which is UDP in this example), UDP source port, UDP destination port, synchronization source (SSRC) identifier, and contributing source (CSRC) identifier. Some of the fields are optional in some embodiments. Other types of applications such as Voice over IP or instant messaging can be identified using a similar technique, although different headers and fields may be used.

Returning to FIG. 4, the header information associated with the packet is looked up in a database of application flows (406). If the header information is not found in the database, it is determined whether a new application flow can be created based on the header information (407). If so, a new entry that includes information identifying the new application flow is created in the application flow database (408). If a new application flow cannot be created, the packet is discarded and appropriate error handling such as event logging is optionally performed. New application flows are disallowed in some embodiments where the system is configured to only allow pre-configured application flows.

If, however, the header information is found in the database, the packet is mapped to an application flow (410). Admission control is optionally performed on the flow (412). In various embodiments, admission control includes shaping traffic by changing the packets priority, applying a policy/rule, tagging, dropping the packet, etc. If the packet is not dropped by admission control, it is mapped to one or more Pseudowires configured to service the application flow (414). In some embodiments, a database of available Pseudowires is searched to find one or more suitable Pseudowires for carrying the application flow. The mapping is based on, among other things, IP routing or manual configuration.

As previously discussed, the mapping of application flow to Pseudowire may be one-to-one, N-to-one, or one-to-N. One-to-one mapping is the most straightforward. Sometimes multiple application flows are aggregated into a single flow (N-to-one). Aggregation is appropriate when, for example, the application flows are similar and have the same priority level. Sometimes, an application flow is distributed into multiple streams and transferred over the network via multiple Pseudowires (one-to-N). For example, a large flow exceeding a certain data rate threshold may be split into several Pseudowires to better utilize the available bandwidth. The division of the application flow into multiple streams is based at least in part on application-specific parameters. For example, a large RTP stream is sometimes split based on SSRC or pay-load frame type. In one example, an application flow involves a large RTP stream having a large amount of MPEG traffic over a network without any per flow QoS guarantee. To reduce the impact of dropped packets, the more important packets such as M-frames in the application flow are separated from the rest. The important packets are mapped to a Pseudowire with a higher priority level. The rest of the packets are mapped to one or more lower priority Pseudowires.

Figure 6:
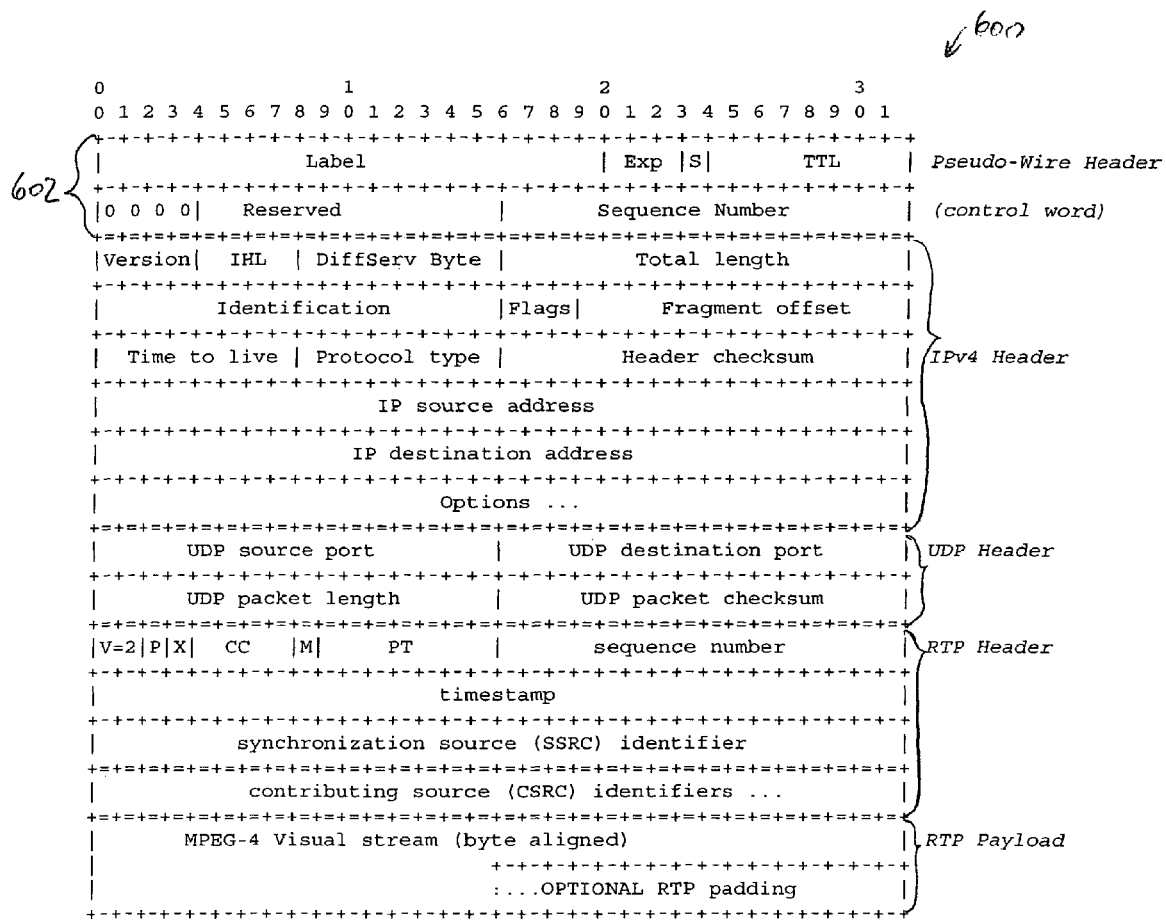
FIG. 6 is a diagram illustrating an example of a Pseudowire encapsulated MPEG-4 packet.

Returning to FIG. 4, once the appropriate Pseudowire for sending the packet is determined, the packet is encapsulated with a Pseudowire header (416) and sent to the core MPLS/IP network (418). FIG. 6 is a diagram illustrating an example of a Pseudowire encapsulated MPEG-4 packet. In this example, a Pseudowire header 602 is pre-pended to packet 600. The Pseudowire header includes packet label information, which has the same format as the of an MPLS packet. In addition to the label information, several other fields are updated to provide information useful for the Application Wire. The sequence number field is used to keep packets in the application flow in the correct order. Ingress packets are assigned sequence numbers in the order they are received by the edge node. The EXP field is used to store service differentiation information such as priority level. The differentiation information is encoded according to the Internet Engineering Task Force (IETF)'s Request For Comments (RFC) 3270. The differentiation information, which is derived based on the service parameters associated with the application flow, gives service providers greater control over service quality for individual flows. In some embodiments, the reserved field in the control word is used for functions such as OAM (e.g. the VCCV function), service guarantee, protection, and flow control.

Since the resulting packet is an MPLS formatted packet, it can be processed by any intermediate nodes on the network (e.g. network routers and switches) as a regular MPLS packet. So long as the intermediate node is a standard MPLS enabled device, no modification is required of the device for processing an Application Wire related packet.

Figure 7:
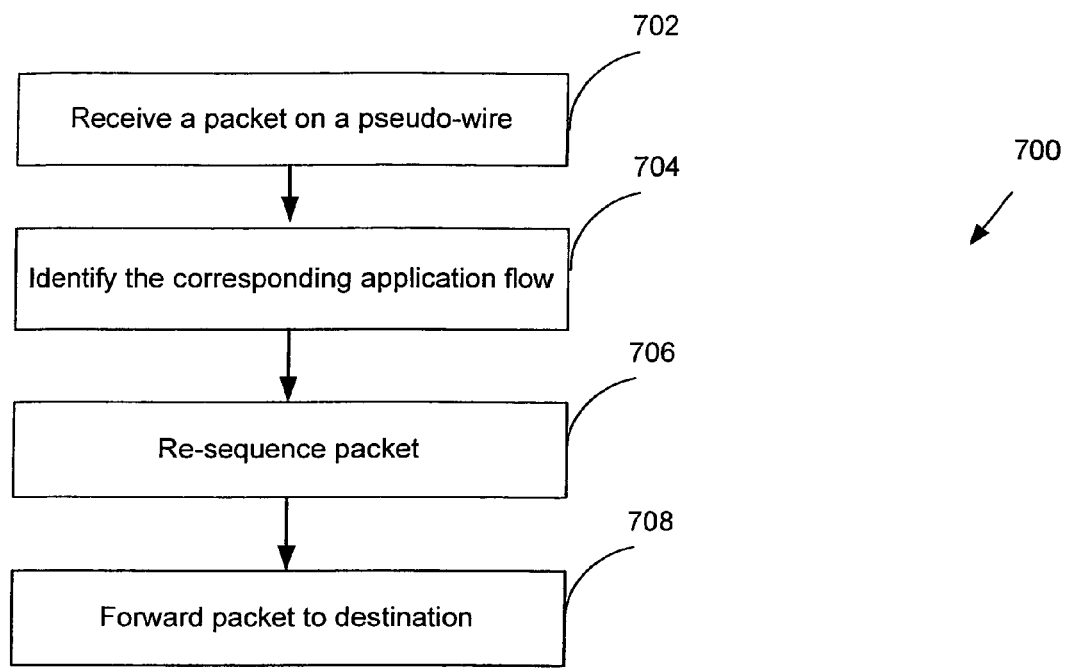
FIG. 7 is a flowchart illustrating an embodiment of a process for handling data traffic in the egress direction.

FIG. 7 is a flowchart illustrating an embodiment of a process for handling data traffic in the egress direction. Process 700 may be implemented on an edge node on the termination end of a Pseudowire. In this example, process 700 initiates when a packet is received on a Pseudowire (702). The application flow that corresponds to the Pseudowire is identified (704). In some embodiments, the identification is accomplished by looking up in a database that maps Pseudowires to application flows. In the event that the Pseudowire is configured to carry more than one application flow, the packet header is further inspected to locate the matching application flow.

Since it is possible for packets sent on different Pseudowires to arrive out of order, the packets are re-sequenced as appropriate (706). In some embodiments, the re-sequencing includes re-sequencing at the Pseudowire level. The sequence number field in the Pseudowire header is examined and used to sort the packets in the appropriate sequence. In some embodiments, the re-sequencing includes an application flow level re-sequencing. Application header and/or payload information is used to sort packets belonging to the same application flow in the appropriate order. For example, the SSRC and the sequence numbers in the RTP header, as well as the payload data are used in some embodiments to re-sequence an RTP flow. Once re-sequenced, the Pseudowire header of the packet is removed and the packet is forwarded to its destination (708).

Figure 8:
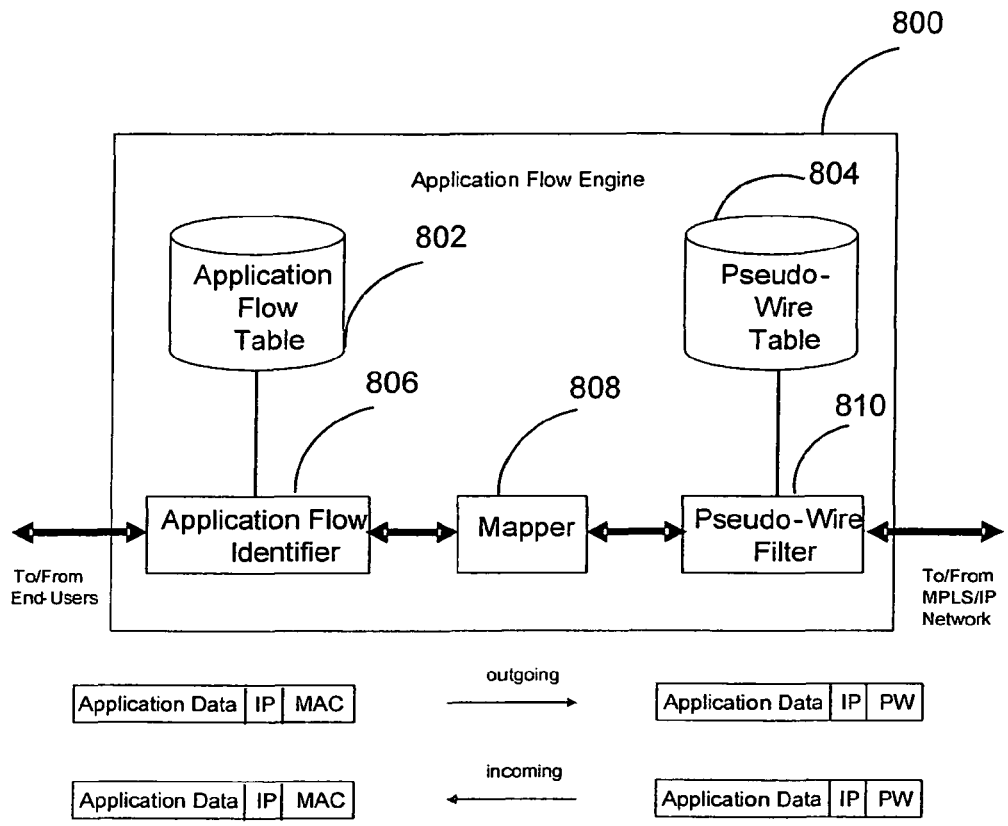
FIG. 8 is a block diagram illustrating an embodiment of an application flow engine.

In some embodiments, processes 300, 400 and 700 are carried out by an application flow engine (AFE). FIG. 8 is a block diagram illustrating an embodiment of an application flow engine. In this example, AFE 800 is included in an edge node device. The components of the AFE may be implemented as software, firmware, hardware or a combination thereof. The AFE is configured to send data streams from the client devices to the core network as well as to receive data streams from the network designated for client devices on the edge network.

When handling ingress data streams, the AFE identifies and maps application flows in the data streams to a plurality of Pseudowires. The application flows are denoted as F= $\{f_1, f_2, \ldots f_n\}$ and the Pseudowires are denoted as W=$\{w_1, w_2, \ldots w_m\}$. An application flow identifier 806 identifies new application flows in the data stream, and stores information associated with the application flows in a database labeled as an application flow table (AFT) 802. The AFT is also used to identify data packets that match application flows already stored in the AFT. Information stored in the AFT includes, among other things, flow identification information and service parameters. The flow identification information includes attributes used to identify the specific application flow and may vary depending on the application. For example, for an RTP-based application flow, the corresponding IP source and destination addresses, UDP protocol type, UDP source and destination port number, SSRC and CSRC are recorded in the AFT. Examples of the service parameters include various measured or assigned characteristics, such as the average and peak bandwidth of the flow, the burst size, the importance level of the flow (for example, emergency 911 traffic is assigned the highest importance and can preempt other flows at runtime), sub-flow information such as the bandwidth and importance levels associated with different sources, as well as other application dependent information such as whether to allow out-of-sequence packets in the flow. In some embodiments, at least a part of the AFT is populated ahead of time by the service provider. For example, the service parameters may be manually configured or populated using a configuration file when the system is initialized. Having a pre-populated AFT allows the service providers to offer different levels of services, and/or provide QoS guarantee based on subscription.

In FIG. 8, a mapper 808 maps incoming data packets to appropriate application flows if possible, and optionally performs admission control functions on the data flows. The mapper also maps each application flow to one or more Pseudowires based on information stored in a Pseudowire table (PWT) 804. A Pseudowire filter 810 encapsulates the packets with Pseudowire headers. The encapsulated packets are sent to the core network.

In some embodiments, the PWT maintains the network-bound Pseudowires, W=$\{w_1, w_2, \ldots w_m\}$. For each Pseudowire, $w_j$, the following attributes are stored in one example: MPLS label for in packet encapsulation, QoS information indicating the level of QoS to be applied to the Pseudowire, Protection Path information identifying one or more backup Pseudowires used to protect this Pseudowire, OAM capability information used for error detection and loop-back, Multicast grouping information such as group ID used to transport multicast traffic over the MPLS/IP network.

When handling egress data streams, a process similar to 700 is carried out by the AFE. The PWT is used to look up the application flows that correspond to the packets received on various Pseudowires. The mapper re-sequences the packets, removes the Pseudowire headers, and forwards the packets to the destination.

The Application Wire techniques described above are also applicable for environments in which multimedia streams are multicasted to multiple sites in the network. To support multicast over Application Wires, a fully-meshed Pseudowire network for each multicast group is set up. Various mechanisms for supporting Pseudowire based multicast can be used, including Virtual Private LAN Service (VPLS) and IP LAN Service (IPLS).

Figure 9:
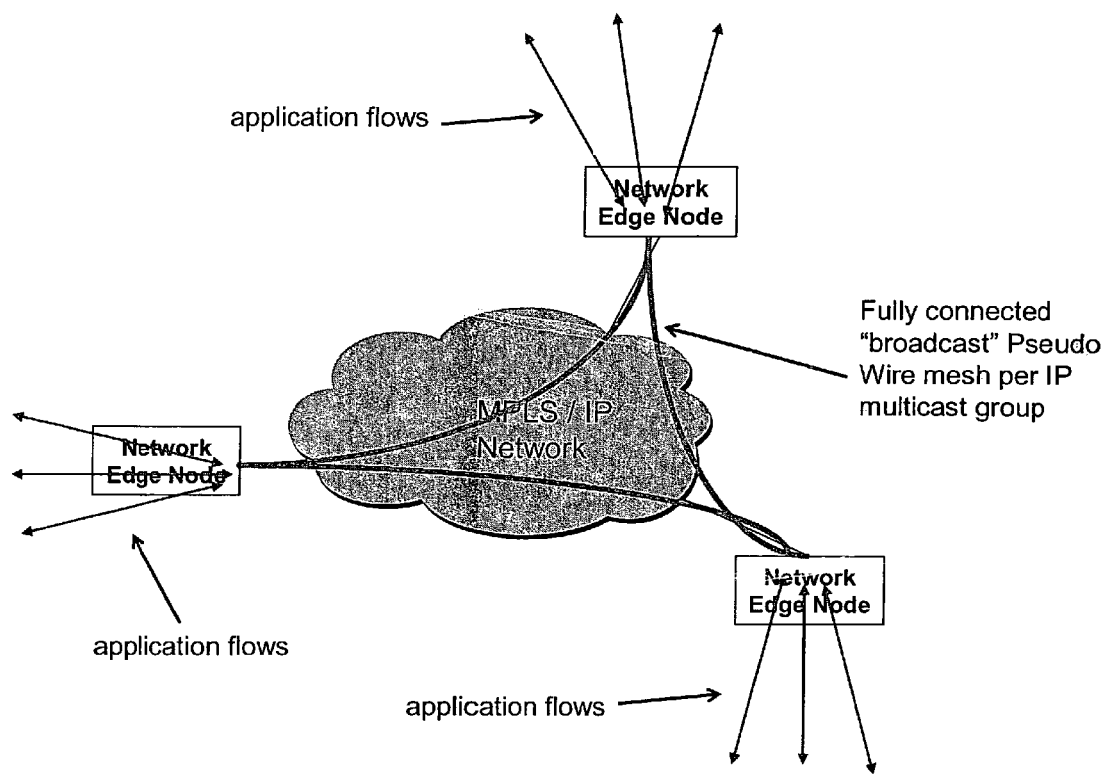
FIG. 9 is a diagram illustrating an example of a multicast environment supporting Application Wires.

FIG. 9 is a diagram illustrating an example of a multicast environment supporting Application Wires. In the example shown, application flow mapping is performed at any given network edge node, and a copy of the data packet is forwarded to all the other edge nodes in the group. In some embodiments, a packet is transmitted following these steps: for an application flow, $f_i^G$, that belongs to a multicast group, G, the PWT is searched and the adjacencies (i.e., the other edge nodes of the group denoted as $A_k^G, A_{k+1}^G \ldots$) are obtained. A copy of the data packet is sent to each adjacency. Between a pair of edge nodes (i.e., one adjacency), there may be multiple Pseudowires, $A_k^G=\{w_j^G, w_{j+1}^G \ldots\}$. As described above, an application flow may be split among the Pseudowires, according to application-specific parameters.

On an egress network edge node, the Pseudowire headers of the packets are removed, the packets are reassembled and/or re-sequenced as necessary, and forwarded to the destination. Any IP or Layer-2 multicast scheme may be used to forward the packets to a destination beyond the network edge nodes.

Control Plane to Data Plane Binding

Figure 10:
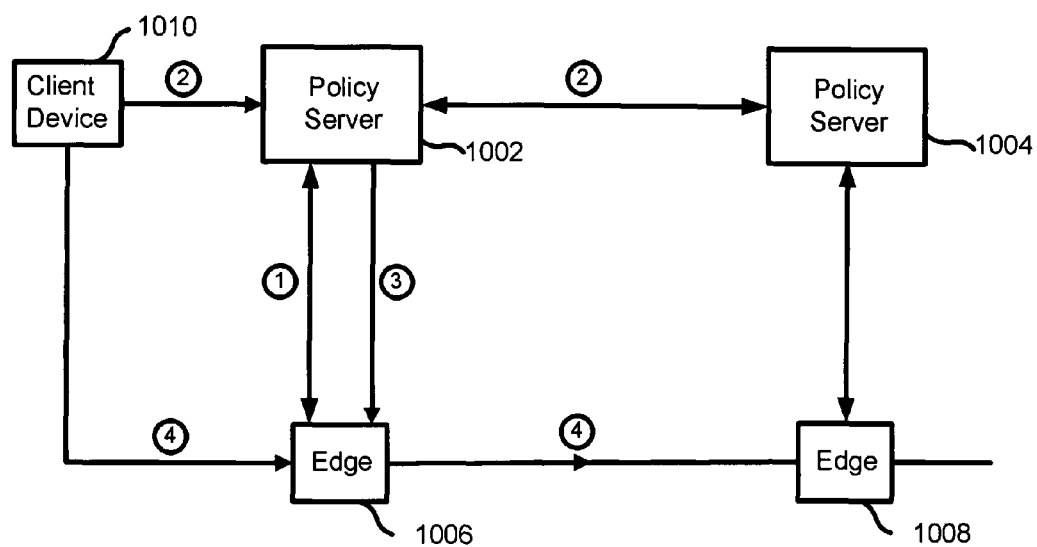
FIG. 10 is a block diagram illustrating an embodiment of a system that binds a control plane to a data plane.

FIG. 10 is a block diagram illustrating an embodiment of a system that binds a control plane to a data plane. In the example shown, client device 1010 is a device that resides on an edge network, such as any one of client devices 102, 104, and 202-218. Edge devices 1006 and 1008 are devices that support MPLS, such as edge nodes 106, 109, 220, and 222. As such, edge devices 1006 and 1008 are capable of mapping application flows into Pseudowires and vice versa.

Policy servers 1002 and 1004 have a predefined or established relationship with edge nodes 1006 and 1008, respectively. Examples of policy servers include: IP Multimedia Subsystem (IMS) and DSL subscriber policy servers. Policy servers 1002 and 1004 are capable of communicating with each other over a control plane network. In some embodiments, policy servers 1002 and 1004 are capable of securely communicating with edge nodes 1006 and 1008, respectively. For example, the interface may be an XML (Pegador SOAP), RADIUS, or other secure interface.

In this system, before the flow of data, policies are downloaded from the policy servers to the edge nodes. There is no dependency on an underlying network control protocol to trigger the downloading of the policies. In some embodiments, the policy includes service information, such as service level agreement (SLA) information (e.g., QoS), accounting information, characteristics of the flow, flow management data, and any other appropriate information. Predictable service guarantee refers to meeting a specified quality of service. Quality of service may be specified in various ways in various embodiments, such as bandwidth or delay guarantees.

The paths labeled 1-4 in FIG. 10 shows an example of a sequence of communications corresponding to a control plane to data plane binding:

(1) A network topology exchange is performed between policy server 1002 and edge node 1006. For example, an indication that policy server 1002 is up and running is sent to edge node 1002. This may be performed when the network first comes up, for example.

(2) Client device 1010 communicates with policy server 1002 using a SIP-based protocol to request session setup. In various embodiments, this communication may be performed in various ways. For example, the communication may be wireless, or the communication may be sent via edge node 1006. Examples of SIP-based protocols include SIP, the signaling protocol defined and/or implemented by Skype, and the modified protocols based on SIP by MSN, Vonage, Google and Yahoo.

For example, when a user picks up a telephone or requests a conferencing session on demand, client device 1010 sends a session request to policy server 1002 via SIP. The SIP messages include service information, such as media stream identification and resource information. Policy server 1002 receives the session request, determines that the session will be via edge node 1006 and notifies client device 1010.

(3) Service parameters are downloaded from policy server 1002 to edge node 1006 for each application flow. In some embodiments, service parameters include QoS and protection information. In some embodiments, edge node 1006 maps the service parameters to an application wire. For example, the service parameters are used to populate an AFT. The service parameters may be used by edge node 1006 to provide a predictable service guarantee.

(4) A Pseudowire is established and application data is sent over the Pseudowire. In some embodiments, an application flow is mapped to one or more Pseudowires, as previously described.

This sequence is transparent to client device 1010 and other nodes in the core network. In some embodiments, this sequence is performed whenever the session or edge node changes. For example, client device 1010 may be a mobile phone that is roaming to a new geographical location associated with a different edge node.

In some embodiments, service parameters are downloaded (3) when a subscription is provisioned on the policy server. In this case, the AFT may be pre-populated by the edge node.

This sequence of communications involves processes performed by the policy server and by the edge node. Examples of such processes are given in the following figures.

Figure 11:
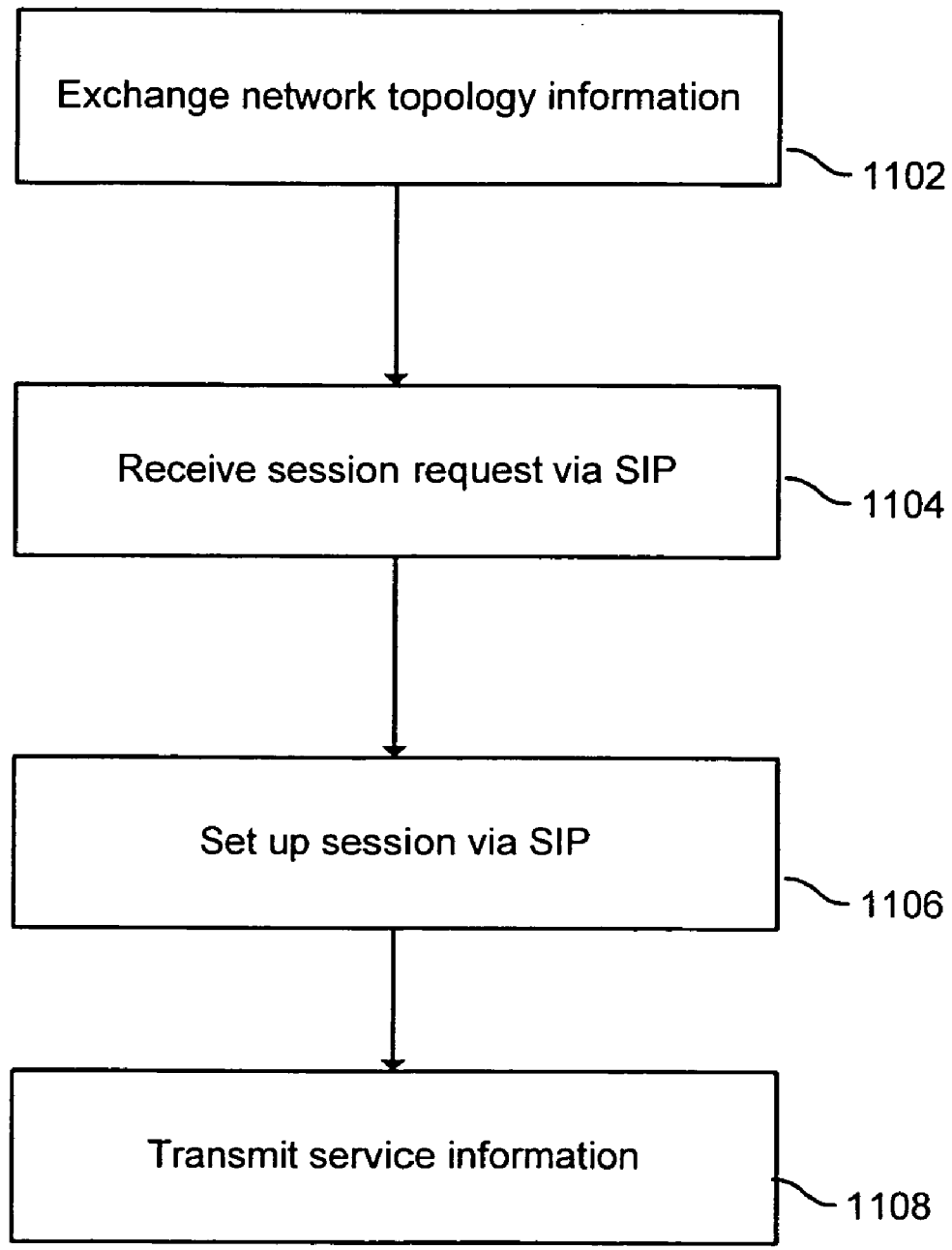
FIG. 11 is a flowchart illustrating an embodiment of a control plane to data plane binding process from the perspective of a policy server.

FIG. 11 is a flowchart illustrating an embodiment of a control plane to data plane binding process from the perspective of a policy server, such as policy server 1002. At 1102, network topology information is exchanged between the policy server (or SIP server) and edge node (or gateway). Examples of information that is exchanged include health information, gateway information (e.g., IP address, interfaces, link bandwidth, etc.), and server capability information (edge nodes need to know if servers can support a particular application). In some embodiments, the signaling between the policy server and edge node uses a secure protocol, such as DIAMETER or SOAP.

At 1104, a session request is received via SIP. For example, a user picks up a handset or requests video on demand and a client device sends a session request to the policy server. At 1106, a session is set up via SIP. For example, based on the network topology, the policy server selects an appropriate edge node and indicates that to the client device. In some embodiments, once the session is set up, the policy server has obtained the priority or importance of the session (e.g., E911) and media stream information. For example, SIP uses the session description protocol (SDP) to describe session information for a media stream. SDP includes an RTP port number and encoding information.

At 1108, service information is transmitted (or downloaded) to the edge node. Examples of service information include application flow information and service parameters. Examples of application flow information include IP source address, IP destination address, protocol type (e.g., UDP), UDP source port, UDP destination port, SSRC (multimedia stream source ID generated be client device), CSRC (e.g., if the traffic feed functions as an RTP mixer), and RTP information. Examples of service parameters include average and peak bandwidth, burst size, burst rate, the importance level of the flow (e.g., the traffic for E911 will have the highest value, which can preempt other flows at runtime), sub-flow information (e.g., each source (SSRC) may have its own bandwidth and precedence levels), and other application dependent information (e.g., whether out of sequence is allowed for the flow). In some embodiments, the signaling between the policy server and the edge node uses a secure protocol, such as DIAMETER or SOAP.

Figure 12:
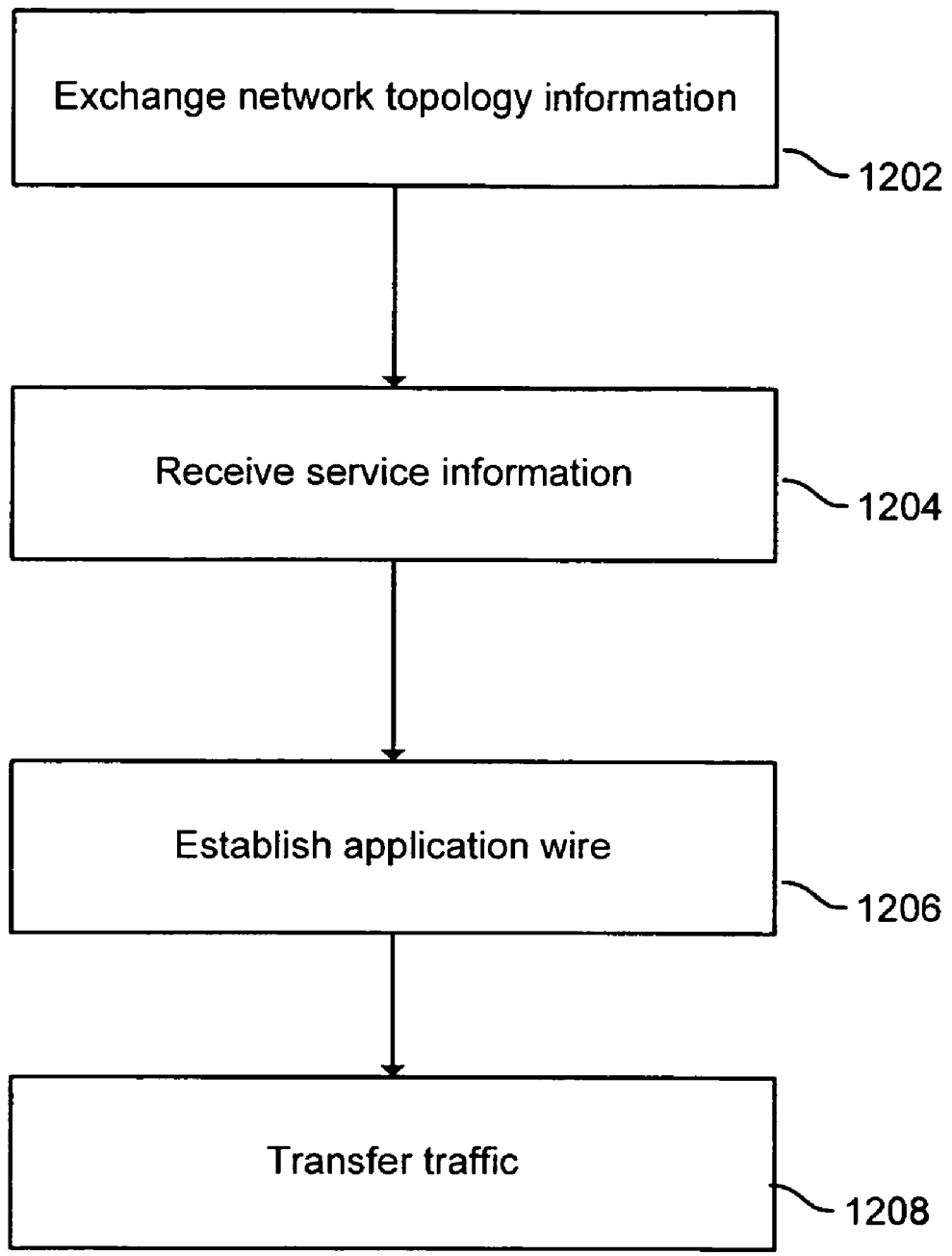
FIG. 12 is a flowchart illustrating an embodiment of a control plane to data plane binding process from the perspective of an edge node.

FIG. 12 is a flowchart illustrating an embodiment of a control plane to data plane binding process from the perspective of an edge node, such as edge node 1006. At 1202, network topology information is exchanged with a policy server, as previously described. At 1204, service information received. In some embodiments, the service information transmitted by a policy server at 1108 is received. At 1206, an application wire is established. In some embodiments, an AFT is populated based on the received service parameters. In some embodiments, application wire set up is provision based on any of the techniques more fully described above. At 1208, traffic is transferred from the application wire over one or more Pseudowires, as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of binding a control plane to a data plane, including:
   receiving, via a server, a request from a client device to initiate a session, wherein the request is sent via a Session Initiation Protocol (SIP)-based protocol, the session being capable of transporting application flows generated by a client device application, the client device application configured to generate identifiable layer 3 data;
   setting up the session, via the server, including selecting, based at least in part on network topology and in response to the request from the client device, a client device edge node from a plurality of client device edge nodes to participate in the session, wherein the client device edge node is configured to associate the client device with a core network and is configured to identify the session data and non-session data;
   transmitting, via the server, a set of one or more service parameters associated with the request to the edge node; wherein at least some of the service parameters are used for configuring the client device edge node to:
      map one or more application flows to one or more Pseudowires according to one or more of a plurality of mapping schemes,
      provide a Quality of Service (QoS) for the session data, and
      exclude the non-session data from the one or more mapped Pseudowires;
   configuring of the client device edge node prior to an initial flow of application flow data between the client device and the client device edge node; and
   at least one of the plurality of mapping schemes is selected based at least in part on at least one of a bandwidth requirement associated with a corresponding application flow and a traffic requirement associated with the corresponding application flow, wherein the plurality mapping schemes include a one-to-one mapping where a single application flow is mapped to a single Pseudowire, a distributed mapping where a single application flow is mapped to multiple Pseudowires, and an aggregated mapping where multiple application flows are mapped to a single Pseudowire.

2. The method as recited in claim 1, wherein the client device edge node uses at least one of the service parameters to set up an application wire.

3. The method as recited in claim 1, wherein the client device edge node uses at least one of the service parameters to provide a predictable service guarantee.

4. The method as recited in claim 1, wherein the set of one or more service parameters is sent via a secure protocol.

5. The method as recited in claim 1, the session is associated with a media stream for sending video data.

6. The method as recited in claim 1, wherein receiving the request to initiate the session, setting up the session, and transmitting the set of service parameters are performed each time the client device edge node changes or the session changes.

7. The method as recited in claim 1, wherein the service parameters include one or more of: average bandwidth, peak size, burst size, burst rate, an importance level of a flow, sub-flow information, and application dependent information.

8. The method as recited in claim 1, further including transmitting application flow information, wherein the application flow information includes one or more of: IP source address, IP destination address, protocol type, protocol source port, protocol destination port, synchronization source (SSRC) identifier, contributing source (CSRC) identifier, or RTP information.

9. The method as recited in claim 1, wherein the SIP-based protocol includes one of: SIP, a signaling protocol defined or implemented or both by SKYPE™, or a modified SIP-based protocol developed by MSN™, VONAGE™, GOOGLE™ or YAHOO™.

10. The method as recited in claim 1, wherein transmitting is performed by a policy server.

11. The method as recited in claim 1, wherein transmitting is performed by a policy server that has a predefined relationship with the client device edge node.

12. The method as recited in claim 1, wherein transmitting is performed by a policy server that is physically separate from the client device edge node.

13. The method as recited in claim 1, further including populating an application flow table (AFT) using one or more of the service parameters.

14. The method as recited in claim 1, further including transferring data via one or more Pseudowires.

15. The method as recited in claim 1, further including transferring data over a Multi Protocol Label Switching (MPLS) core network.

16. The method as recited in claim 1, wherein transmitting is independent of an underlying network control protocol.

17. A system for binding a control plane to a data plane, including:
   a processor configured to:
      initiate a session based at least in part on a request received, via a server, from a client device, wherein the request is sent via a Session Initiation Protocol (SIP)-based protocol, the session being capable of transporting application flows generated by a client device application, the client device application configured to generate identifiable layer 3 data;
      set up the session, via the server, including selecting, based at least in part on network topology and in response to the request from the client device, a client device edge node from a plurality of client device edge nodes to participate in the session, wherein the client device edge node is configured to associate the client device with a core network and is configured to identify the session data and non-session data;
      initiate a transmission, via the server, of a set of one or more service parameters associated with the request to the client device edge node; wherein at least some of the service parameters are used for configuring the client device edge node to:
         map one or more application flows to one or more Pseudowires according to one or more of a plurality of mapping schemes,
         provide a Quality of Service (QoS) for the session data, and
         exclude the non-session data from the one or more mapped Pseudowires;
      configure the client device edge node occurs prior to an initial flow of application flow data between the client device and the client device edge node;

at least one of the plurality of mapping schemes is selected from two or more of the one or more mapping schemes based at least in part on at least one of a bandwidth requirement associated with a corresponding application flow and a traffic requirement associated with the corresponding application flow, wherein the plurality of mapping schemes include a one-to-one mapping where a single application flow is mapped to a single Pseudowire, a distributed mapping where a single application flow is mapped to multiple Pseudowires, and an aggregated mapping where multiple application flows are mapped to a single Pseudowire; and a memory coupled with the processor, wherein the memory provides the processor with instructions.

18. An article capable of binding a control plane to a data plane, the article being embodied in a non-transitory computer readable storage medium and comprising computer instructions stored thereon, which, if executed by one or more processors, operatively enable a computing device to:

receive, via a server, a request from a client device to initiate a session, wherein the request is sent via a Session Initiation Protocol (SIP)-based protocol, the session being capable of transporting application flows generated by a client device application, the client device application configured to generate identifiable layer 3 data;

set up a session, via the server, including selecting, based at least in part on network topology and in response to the request from the client device, a client device edge node from a plurality of client device edge nodes to participate in the session, wherein the client device edge node is configured to associate the client device with a core network and is configured to identify the session data and non-session data;

transmit, via the server, a set of one or more service parameters associated with the request to the client device edge node; wherein at least some of the service parameters are used for configuring the client device edge node to:

map one or more application flows to one or more Pseudowires according to one or more of a plurality of mapping schemes, provide a Quality of Service (QoS) for the session data, and exclude the non-session data from the one or more mapped Pseudowires;

configure the client device edge node occurs prior to an initial flow of application flow data between the client device and the client device edge node; and at least one of the plurality of mapping schemes is selected based at least in part on at least one of a bandwidth requirement associated with a corresponding application flow and a traffic requirement associated with the corresponding application flow, wherein the plurality of mapping schemes include a one-to-one mapping where a single application flow is mapped to a single Pseudowire, a distributed mapping where a single application flow is mapped to multiple Pseudowires, and an aggregated mapping where multiple application flows are mapped to a single Pseudowire.

* * * * *